(12) United States Patent
Bogatscher et al.

(10) Patent No.: US 11,125,876 B2
(45) Date of Patent: Sep. 21, 2021

(54) LIDAR SYSTEM AND METHOD FOR ASCERTAINING A SYSTEM STATE OF A LIDAR SYSTEM

(71) Applicant: Robert Bosch GmbH, Stuttgart (DE)

(72) Inventors: Siegwart Bogatscher, Sersheim (DE); Reiner Schnitzer, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 15/943,109

(22) Filed: Apr. 2, 2018

(65) Prior Publication Data

US 2018/0284271 A1    Oct. 4, 2018

(30) Foreign Application Priority Data

Apr. 3, 2017 (DE) .......................... 102017205631.2

(51) Int. Cl.
| | |
|---|---|
| *G01S 17/06* | (2006.01) |
| *G01S 7/497* | (2006.01) |
| *G01S 17/42* | (2006.01) |
| *G02B 26/10* | (2006.01) |
| *G01S 7/481* | (2006.01) |
| *G02B 27/09* | (2006.01) |
| *G02B 27/14* | (2006.01) |
| *G02B 26/08* | (2006.01) |

(52) U.S. Cl.
CPC ............ *G01S 17/06* (2013.01); *G01S 7/4812* (2013.01); *G01S 7/497* (2013.01); *G01S 17/42* (2013.01); *G02B 26/105* (2013.01); *G02B 27/0955* (2013.01); *G02B 27/0977* (2013.01); *G02B 26/0833* (2013.01); *G02B 27/14* (2013.01); *G02B 27/145* (2013.01)

(58) Field of Classification Search
None
See application file for complete search history.

(56) References Cited

U.S. PATENT DOCUMENTS

| | | | | |
|---|---|---|---|---|
| 5,191,384 | A * | 3/1993 | Nakanishi | G01S 17/08 356/3.01 |
| 5,311,012 | A * | 5/1994 | Juds | G01S 7/4918 250/222.1 |
| 9,086,273 | B1 * | 7/2015 | Gruver | G01S 17/42 |

(Continued)

FOREIGN PATENT DOCUMENTS

| | | |
|---|---|---|
| DE | 102006031114 A1 | 1/2008 |
| EP | 2789972 A1 | 10/2014 |
| EP | 3118651 A1 | 1/2017 |

*Primary Examiner* — Yuqing Xiao
*Assistant Examiner* — Amir J Askarian
(74) *Attorney, Agent, or Firm* — Norton Rose Fulbright US LLP; Gerard Messina (57) ABSTRACT

A LiDAR system and a method for ascertaining a system state of a LiDAR system, includes an optical source, a mirror, a partially transparent element, a detector array and an evaluation unit. The optical elements of the LiDAR system are arranged so that a component of the light beam is reflected by the partially transparent element onto the detector array. The evaluation unit is configured to receive a detector signal from the detector array, which describes a dimension, shape and/or position of the second component of the light beam projected on the detector array, and to ascertain from the detector signal a system state of the LiDAR system.

12 Claims, 4 Drawing Sheets

(56) References Cited

U.S. PATENT DOCUMENTS

| | | | |
|---|---|---|---|
| 9,915,733 B2* | 3/2018 | Fried | G01S 7/481 |
| 10,436,907 B1* | 10/2019 | Murray | G01N 15/06 |
| 2004/0211887 A1* | 10/2004 | Lofthouse-Zeis | G02B 27/0977 250/214 R |
| 2008/0002191 A1* | 1/2008 | Napierala | G01S 17/89 356/139.03 |
| 2008/0029690 A1* | 2/2008 | Hashimoto | G01S 7/4816 250/214.1 |
| 2010/0165322 A1* | 7/2010 | Kane | G01S 7/481 356/4.01 |
| 2010/0194942 A1* | 8/2010 | Wada | G01S 17/48 348/294 |
| 2010/0292886 A1* | 11/2010 | Szczerba | G01S 13/723 701/31.4 |
| 2011/0097006 A1* | 4/2011 | Mansour | G01S 7/52034 382/251 |
| 2011/0102240 A1* | 5/2011 | Stewart | H01Q 13/206 342/92 |
| 2011/0157578 A1* | 6/2011 | Hane | G01S 17/46 356/5.1 |
| 2011/0248170 A1* | 10/2011 | Holcombe | G01J 1/4204 250/340 |
| 2011/0304840 A1* | 12/2011 | Hsu | G01C 3/10 356/4.03 |
| 2012/0133799 A1* | 5/2012 | Findlay | G01S 7/4816 348/241 |
| 2014/0078514 A1* | 3/2014 | Zhu | G01S 17/10 356/606 |
| 2014/0307252 A1* | 10/2014 | Hinderling | G02B 26/004 356/141.4 |
| 2015/0176977 A1* | 6/2015 | Abele | G01S 17/08 356/614 |
| 2016/0007009 A1* | 1/2016 | Offenberg | G01S 17/86 348/46 |
| 2016/0047895 A1* | 2/2016 | Dussan | G01S 17/89 356/4.01 |
| 2016/0119594 A1* | 4/2016 | Asano | H04N 5/33 348/245 |
| 2016/0187470 A1* | 6/2016 | Becker | G01S 17/42 356/3.09 |
| 2017/0131387 A1* | 5/2017 | Campbell | G01S 17/89 |
| 2017/0176575 A1* | 6/2017 | Smits | G01S 7/484 |
| 2018/0011194 A1* | 1/2018 | Masuda | G01S 17/10 |
| 2018/0100928 A1* | 4/2018 | Keilaf | G01S 7/4817 |
| 2018/0120434 A1* | 5/2018 | Jeong | G01S 17/08 |
| 2018/0275249 A1* | 9/2018 | Campbell | G01S 17/42 |
| 2018/0284240 A1* | 10/2018 | LaChapelle | G01S 17/10 |
| 2018/0284242 A1* | 10/2018 | Campbell | G01S 17/42 |

* cited by examiner

LIDAR SYSTEM AND METHOD FOR ASCERTAINING A SYSTEM STATE OF A LIDAR SYSTEM

FIELD OF THE INVENTION

The present invention relates to a LiDAR system and to a method for ascertaining a system state of a LiDAR system.

BACKGROUND INFORMATION

Current LiDAR systems comprise a position sensor system, which is suitable for detecting a position of a movable micromirror of the LiDAR system. This is achieved by piezoresistive sensors, which are situated on torsion springs and which are used in a measuring bridge as a position sensor system. This entails disadvantages however. Thus the piezoresistive sensors are not able to measure effectively occurring oscillation modes of the mirror such as e.g. out-of-plane modes, which are excited by mechanical interference injection, such as for example shock or vibration, and are superimposed on a useful oscillation. Furthermore, the position sensor system sometimes measures modes that are not occurring effectively. The position sensor system is unable to detect slow drift, for example drifting of the amplitude of oscillation. Furthermore, such a sensor system is unable to detect an optical distortion resulting from a slanted direction of incidence of a laser beam onto the micromirror. Because the analog signal of the measuring bridge is scanned with a clock pulse of its own, the scanning times are not synchronized with the laser shot times. This requires additional computing expenditure for determining precisely the transmit direction of the emitted light pulse.

It is important that LiDAR systems fulfill specific requirements, which are required because of eye safety. Eye safety requires a quick and reliable detection of error states such as e.g. a broken mirror, a mechanical impact or similar errors that may occur in a LiDAR system. It is not possible to achieve such a detection using the position sensor system, which is not able to detect all quick error influences such as e.g. the out-of-plane modes.

Patent document DE102006031114A1 discusses in this connection a laser scanner having an oscillating mirror and a detector from the related art.

SUMMARY OF THE INVENTION

The LiDAR system of the present invention comprises an optical source, which is configured to emit a light beam, a mirror, which is situated in such a way that it reflects the light beam emitted by the optical source, a partially transparent element, which is situated vis-a-vis the mirror in such a way that the light beam strikes the partially transparent element after it was reflected by the mirror, a first component of the light beam passing through the partially transparent element and a second component of the light beam being reflected by the partially transparent element, a detector array, which comprises a plurality of individual sensor and which is situated in such a way that the second component of the light beam is reflected by the partially transparent element onto the detector array, and an evaluation unit, which is configured to receive a detector signal from the detector array, which describes a dimension, shape and/or position of the second component of the light beam projected on the detector array and to ascertain from the detector signal a system state of the LiDAR system.

The method of the present invention for ascertaining a system state of a LiDAR system comprises an emission of a light beam by an optical source, a reflection of the light beam emitted by the optical source by a mirror, a division of the reflected light beam by a partially transparent element into a first component and a second component of the light beam, the first component of the light beam passing through the partially transparent element and a second component of the light beam being reflected by the partially transparent element, a reception of the second component of the light beam by a detector array, which comprises a plurality of individual sensors, and an ascertainment of a system state of the LiDAR system based on a dimension, shape and/or position of the second component of the light beam projected on the detector array.

The optical source is a light source, which generates the light beam, which is used to scan the surroundings of the LiDAR system. The optical source may be a laser. The mirror may be a micromirror. The partially transparent element is an optical component, which is suitable for dividing a light beam, i.e. reflecting the light beam proportionally. Already a reflection on a surface of an otherwise transparent optical component is sufficient to divide the light beam and to create an element to be designated as partially transparent. The detector array comprises a plurality of individual sensors. The sensors in this instance are light-sensitive sensors. This means that they react to incident light. The sensors are for this purpose configured in particular in such a way that they react to a wavelength of the light that is emitted by the optical source. The individual sensors may be photodiodes. The evaluation unit is an electrical circuit. The latter is embodied either in analog or digital fashion. The detector signal describes the optical power output, dimension, shape and/or position of the second component of the light beam projected onto the detector array. The position in this instance describes at what location the second component of the light beam strikes the detector array, that is, it describes a position on a surface of the detector array. The dimension describes in this case a size of an area on a surface of the detector array illuminated by the second component of the light beam. The shape describes how an outer circumference of the area on the surface of the detector array illuminated by the light beam is shaped.

From such a detector signal, it is possible to draw numerous inferences regarding the system state of the LiDAR system. A system state of the LiDAR system is a parameter that describes the LiDAR system. This includes both parameters that may be advantageously evaluated for an operation of the LiDAR system, for example, in order to increase a precision of the measurement, as well as parameters that describe whether the LiDAR system is fully functional. The partially transparent element is an optical component that is suitable for dividing the light beam emitted by the optical source. The partially transparent element is an additional component or a component that is located in a LiDAR system in any case. The partially transparent element may be a glass panel or a lens. The partially transparent element is situated in an optical transmit path of the LiDAR system, it being situated along the transmit path behind the mirror of the LiDAR system. In the process, a portion of the emitted light is reflected on the partially transparent element and strikes the detector array.

The beam diameter of the light beam on the detector array is larger than an individual sensor of the detector element. Thus respectively at least two sensors, that is, in particular photodiodes, are illuminated and by ascertaining a point of concentration it is possible for example to ascertain a direction of the emitted laser pulse. On this basis it is possible either to infer an error in the LiDAR system or to increase an accuracy of measurement. The point of concentration may be ascertained either in an analog circuit or in digital circuit technology or as software in a microcontroller. A directional sensor system is thus created, which on the one hand scans in synchronous fashion with the shot times of the optical source and on the other hand is able to detect effectively occurring mechanical interference injections. Additionally, using measuring technology it is possible to detect an optical distortion due to a slanted angle of incidence of the light beam onto the mirror and a slow drift of a position of the mirror over the service life of the LiDAR system. It is possible to implement such a directional sensor system in a cost-effective manner and it is possible to make use of already existing components that are available in any case in a LiDAR system.

The further descriptions herein disclose further developments of the present invention.

The mirror may be disposed so as to be movable. In this context, the mirror is in particular a micromirror. Furthermore, the mirror may be an oscillating mirror or a rotating mirror. This makes it possible to direct the light beam in different directions and thus to scan a surroundings of the LiDAR system. Since the detector array is situated behind the mirror, when following a propagation of the light beam, it is possible to detect inaccuracies that are caused by the movable mirror. This makes it possible accurately to detect a direction in which the light beam is actually emitted by the LiDAR system.

Furthermore, the detector signal may describe the position of the second component of the light beam on the detector array that is projected on the detector array, the position being a point of maximum brightness of the second component of the light beam on the detector array. In this manner, a detector signal is provided that makes it possible to detect any parameter of the LiDAR system that has an influence on the direction of propagation of the light beam. This allows for an efficient monitoring of the scanning direction and of the orientation of all of the optical components of the LiDAR system.

Furthermore, the individual sensors of the detector array may be coupled to one another via a subtracter circuit. In this manner, it is possible to produce a characteristic curve of an intensity of the second component of the light beam reflected onto the detector array. An influence factor of external light sources is thus minimized. Thus it is possible for example to compensate for an influence of ambient light. Furthermore, in this manner it is possible efficiently to ascertain the point of maximum brightness of the second component of the light beam on the detector array.

Furthermore, the subtracter circuit may be coupled to a multiplexer on the output side. This allows for a selection as to which of the sensors of the detector array shall be used for providing the detector signal. At the same time, it is possible to reduce a maximum number of necessary components.

It is advantageous if only a selection of the sensors of the detector array is active in order to receive the second component of the light beam reflected by the partially transparent element on the detector array. It is thus possible to save energy when operating the LiDAR system. With a corresponding selection of the active sensors, it is additionally possible to achieve a filter effect in that those sensors are not active which the second component of the light beam should not strike in any case if the LiDAR system is intact. Additionally, this allows for a reduced complexity in the circuit technology because only few analog signals need to be scanned simultaneously.

Furthermore, output signals of the sensors may be compared to a threshold value and only those output signals are used for generating the detector signal whose amplitude is greater than the threshold value. In this manner, it is likewise possible to filter out those output signals which are caused by sensors that are struck by undesired, weak light. Such an undesired incidence of light may come from the surroundings of the LiDAR system for example.

The system state of the LiDAR system may describe an orientation of optical components of the LiDAR system, a distortion of the light beam caused by the optical components of the LiDAR system and/or a direction of the second portion of the light beam. This information is especially suitable for increasing a precision of the LiDAR system and for monitoring its functionality.

The evaluation unit may be furthermore coupled to a position sensor, which detects a position of the mirror, the evaluation unit ascertaining an actual position of the mirror by the detector signal and comparing this actual position of the mirror with a position of the mirror detected by the position sensor in order to ascertain the system state. This makes it possible to monitor an accuracy of the position sensor and additionally to ascertain an actual position of the mirror. A measured value of the position sensor may be corrected based on the actual position of the mirror ascertained via the evaluation unit and the detector array.

It is furthermore advantageous if the detector array is situated in such a way that the second component of the light beam strikes the detector array when this second component of the light beam is reflected in a surroundings of the LiDAR system. In other words, this means that the detector array is used both for detecting the system state of the LiDAR system as well as for detecting the surroundings of the LiDAR system. It is thus possible to use a detector array that already exists in a LiDAR system in order to ascertain the system state of the LiDAR system. Thus it is possible to implement a cost-effective LiDAR system.

In summary, the LiDAR system of the present invention thus yields a plurality of advantages. It is thus possible to create a directional sensor system that is able to ascertain a direction of the light beam when the latter is emitted by the LiDAR system. It is thus fundamentally possible to ascertain a deviation of a scanning beam, that is, the first component of the light beam, in two dimensions. It is thus possible to detect any type of mechanical influences on the LiDAR system. Interference modes that cannot be detected by a measuring bridge, are inherently taken into account by such an optical directional sensor system. Such an optical directional sensor system only measures effectively occurring directions. A slow drifting of an amplitude of the mirror, for example a micromirror, or a change of the non-linearities are detected by such an optical directional sensor system. A redundant detection of the angular position of the mirror by two orthogonal measuring principles allows for a reliable detection of error states of the scanning mirror by mutual plausibilization of the measuring results. It becomes possible to perform a mutual recalibration of the directional sensor system and of the position sensor. By adding the optical directional sensor system, it is possible to optimize both the directional sensor system as well as the position sensor for its respective task. It is thus possible to configure the position sensor for a closed-loop mirror control system, for example using a fixed scanning rate, a corresponding band limitation, etc., while the directional sensor system may be configured for the accurate measurement of the actual shooting direction, for example by synchronous scanning with respect to the laser trigger. By time-gating the optical directional sensor system (detector array is for example only active during the laser pulse of approx. 1 ns), it is possible to improve the signal-to-noise ratio by orders of magnitude as compared to a fixed pulse-duty factor. This has an immediate effect on the measurement accuracy. By increasing the number of sensors, it is possible to improve the measuring accuracy of the directional sensor system further if required. A measurement of the emitted laser power output and of the pulse length is additionally advantageous for reasons of eye safety. Typically, a monitor photodiode is used for this task for measuring the power output and the pulse length of the emitted laser beam downstream from the laser. This may be omitted. The signal on the detector array may be used additionally as reference signal for starting the light runtime measurement.

Exemplary embodiments of the present invention are described in detail below with reference to the accompanying drawings.

DETAILED DESCRIPTION

Figure 1:
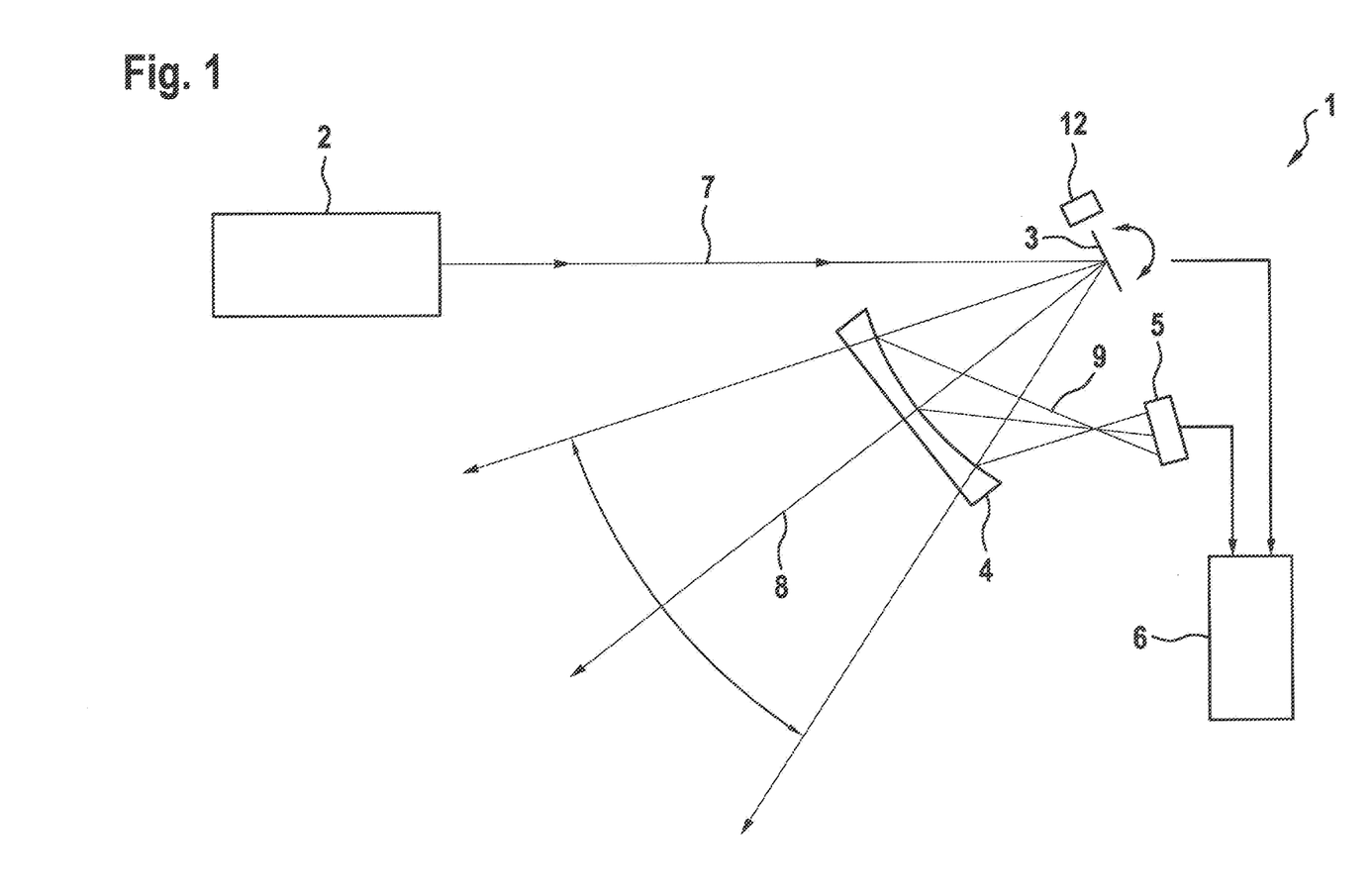
FIG. 1 shows a schematic representation of a LiDAR system 1 according to a first specific embodiment of the invention.

FIG. 1 shows a schematic representation of a transmitter unit of a LiDAR system 1 according to a first specific embodiment of the invention, a receiver unit not being represented for the sake of simplicity. LiDAR system 1 comprises an optical source 2, a mirror 3, a partially transparent element 4, a detector array 5 and an evaluation unit 6.

Optical source 2 is configured to emit a light beam 7. Optical source 2 is a laser. Light beam 7 is therefore a laser beam. Mirror 3 is disposed in such a way that it reflects the light beam 7 emitted by optical source 2. Mirror 3 is a micromirror. Mirror 3 is disposed so as to be movable. Mirror 3 is an oscillation mirror in this first specific embodiment. The oscillation of the mirror may be either resonant or quasi static. This oscillatory motion is indicated in FIG. 1 by a double arrow. Mirror 3 thus oscillates from its position of rest alternately in different directions. In the process, the mirror turns in alternating directions about a bearing axle.

The partially transparent element 4 is disposed with respect to mirror 3 in such a way that the light beam strikes the partially transparent element 4 after it was reflected by mirror 3. In the trajectory of light beam 7, the mirror is thus situated between optical source 2 and partially transparent element 4. Partially transparent element 4 is an optical lens. For this purpose it suffices that only a small portion of light beam 7 is reflected on the surface of partially transparent element 4 in order to satisfy the conditions of being able to consider the lens as partially transparent. The partially transparent element 4 in the form of a lens is either configured to focus, to collimate light beam 7 or not to influence it substantially (e.g. plane-parallel) when it exits LiDAR system 1. It is thus possible to optimize LiDAR system 1 for a specific scanning range. The component of light beam 7, which is not reflected by partially transparent element 4, passes through partially transparent element 4. This component of light beam 7 is designated as a first component 8 of light beam 7 and is used as the scanning beam. A second component 9 of light beam 7 is the component of light beam 7 that is reflected on the surface of partially transparent element 4. Element 4 may be configured so as to allow for the detector array to be constructed in a small and therefore cost-effective manner.

Detector array 5 has a plurality of individual sensors 21, 22, 23, 24, 25. These may be arranged in a row or alternatively in the form of a two-dimensional matrix. Sensors 21, 22, 23, 24, 25 are photodiodes. Detector array 5 has an active surface, which is oriented in such a way that the component of light beam 7 that is reflected by partially transparent element 4, that is, second component 9 of light beam 7, strikes detector array 5. Described in simple words, it may be said that light beam 7 produces a light spot on the surface of detector array 5.

Evaluation unit 6 is an electronic component configured to receive a detector signal from detector array 5. The detector signal is a signal provided by detector array 5. Evaluation unit 6 is therefore coupled with detector array 5. The detector signal is a signal that describes a dimension, shape and position of the second component 9 of light beam 7 that is projected on detector array 5. Depending on what information the detector signal comprises, it is possible to draw different inferences regarding a system state of the LiDAR system.

If the detector signal comprises information about a dimension of the second component 9 of light beam 7 projected onto detector array 5, that is, if it describes how many of the sensors of detector array 5 are excited by light beam 7, then it is possible to infer for example that light beam 7 is being focused. If a change occurs, for example due to the fact that a distance between individual components of the LiDAR system 1 changes, then this may be detected.

If the detector signal describes a shape of the second component 9 of light beam 7 that is projected onto detector array 5, then it is possible to detect a distortion of light beam 7. Such a distortion may be caused for example by a deformation of mirror 3 or of partially transparent element 4. Thus it is possible for example to detect deformations of LiDAR system 1.

If the detector signal describes a position of the second component 9 of light beam 7 that is projected onto detector array 5, then it is possible to infer from this a direction in which light beam 7, in particular first component 8 of light beam 7, exits LiDAR system 1 in order to scan a surroundings of LiDAR system 1.

In this first specific embodiment, the detector signal comprises information regarding dimension, shape and position of the detector array. In alternative specific embodiments, it suffices if the detector signal comprises merely at least one of these information items, that is, at least the dimension, shape or position of the detector array.

Depending on which information is required, evaluation unit 6 performs a respective evaluation. For this purpose, in particular the dimension, shape and position of the second component 9 of light beam 7 projected on detector array 5 are stored, which result in an operation of LiDAR system 1 if the latter is in an optimized operating range. If LiDAR system 1 deviates from this optimized state, then this is detected by evaluation unit 6 by a comparison with a currently detected dimension, shape and position of the second component 9 of light beam 7 projected on detector array 5 and may be compensated if necessary.

Figure 2:
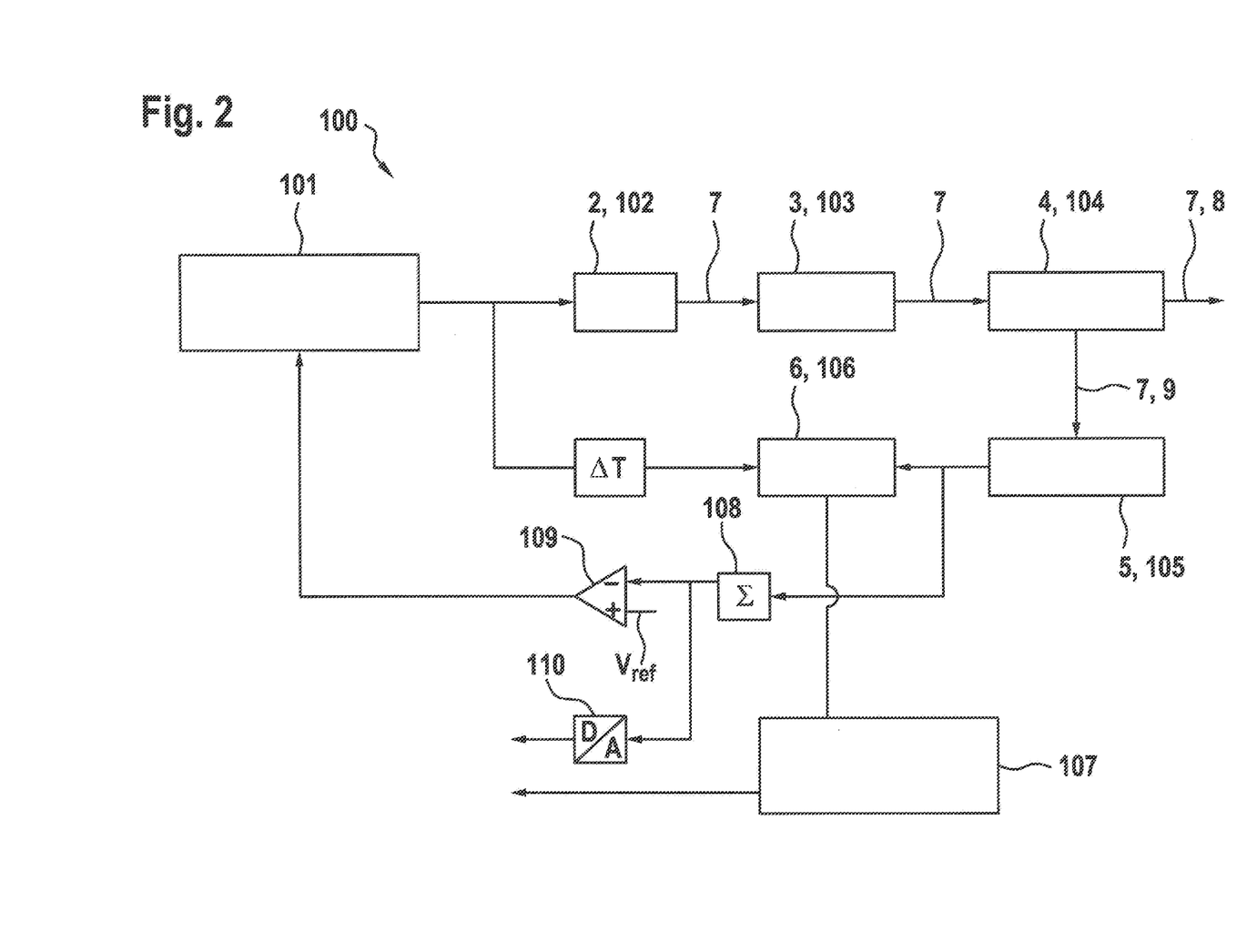
FIG. 2 shows a diagram showing a signal flow in the LiDAR system of the invention according to the first specific embodiment.

FIG. 2 shows a diagram 100, which represents a signal flow of LiDAR system 1. In this instance both individual elements of LiDAR system 1 as well as the signal flow between these elements are schematically shown in FIG. 2.

A first element 101 represents a time-of-flight or TOF system. This is a system that allows for a distance measurement by which individual points in the surroundings of LiDAR system 1 are scanned. The TOF system transmits a trigger signal to optical source 2 in order to emit light beam 7. Optical source 2 is represented in FIG. 2 by a second element 102.

Optical source 2 emits light beam 7, which is reflected by mirror 3, which is symbolized in FIG. 2 as a third element 103. Light beam 7 is reflected there and is directed onto partially transparent element 4, which is a lens. Partially transparent element 4 is represented in FIG. 2 also by a fourth element 104. Partially transparent element 4 divides light beam 7 into first component 8 and second component 9 of light beam 7. Second component 9 of light beam 7 strikes detector array 5, which is represented in FIG. 2 by a fifth element 105. Detector array 5 provides the detector signal and transmits it to evaluation unit 6, which is represented in FIG. 2 a sixth element 106. Evaluation unit 6 is additionally provided with the trigger signal, which is output by the TOF system, that is, by first element 101. The detector signal is considered merely for a time period that is within a time interval ΔT since the output of the trigger signal. This ensures that the system state of the LiDAR system is evaluated only while light beam 7 is emitted. In a subsequent time phase, detector array 5 may be used to receive light beam 7 reflected back from the surroundings of LiDAR system 1. Detector array 5 is for this purpose arranged in such a way that second component 9 of light beam 7 strikes detector array 5 when this second component 9 of light beam 7 is reflected in the surroundings of LiDAR system 1.

The point of concentration is calculated in a calculation step 107, which means that the location at which second component 9 of light beam 7 struck detector array 5 is ascertained. A position of second component 9 of light beam 7 projected on detector array 5 is thus ascertained. Furthermore, a calculation model is stored for calculation step 107, which describes LiDAR system 1. Based on the calculation model and the calculated point of concentration, an emission direction of the LiDAR system is calculated. This information is provided as a system state of LiDAR system 1 and may be used when calculating a position of objects in the surroundings of LiDAR system 1.

When detector array 5 receives second component 9 of light beam 7, then the output signals output by sensors 21, 22, 23, 24, 25 are also added. This occurs in a summation step 108. The sum thus formed is compared with a reference value, here a reference voltage Vref. This occurs for example by way of a comparator, which is shown in FIG. 2 as a ninth element 109. If this sum exceeds a predefined reference value, then this means that light beam 7 is emitted in sufficient intensity. This signal is supplied to first element 101 as the start signal for the time-of-flight measurement. At the same time, the sum is converted into a digital value by a D/A converter 110 and is provided as an indicator that describes a power of light beam 7.

Figure 3:
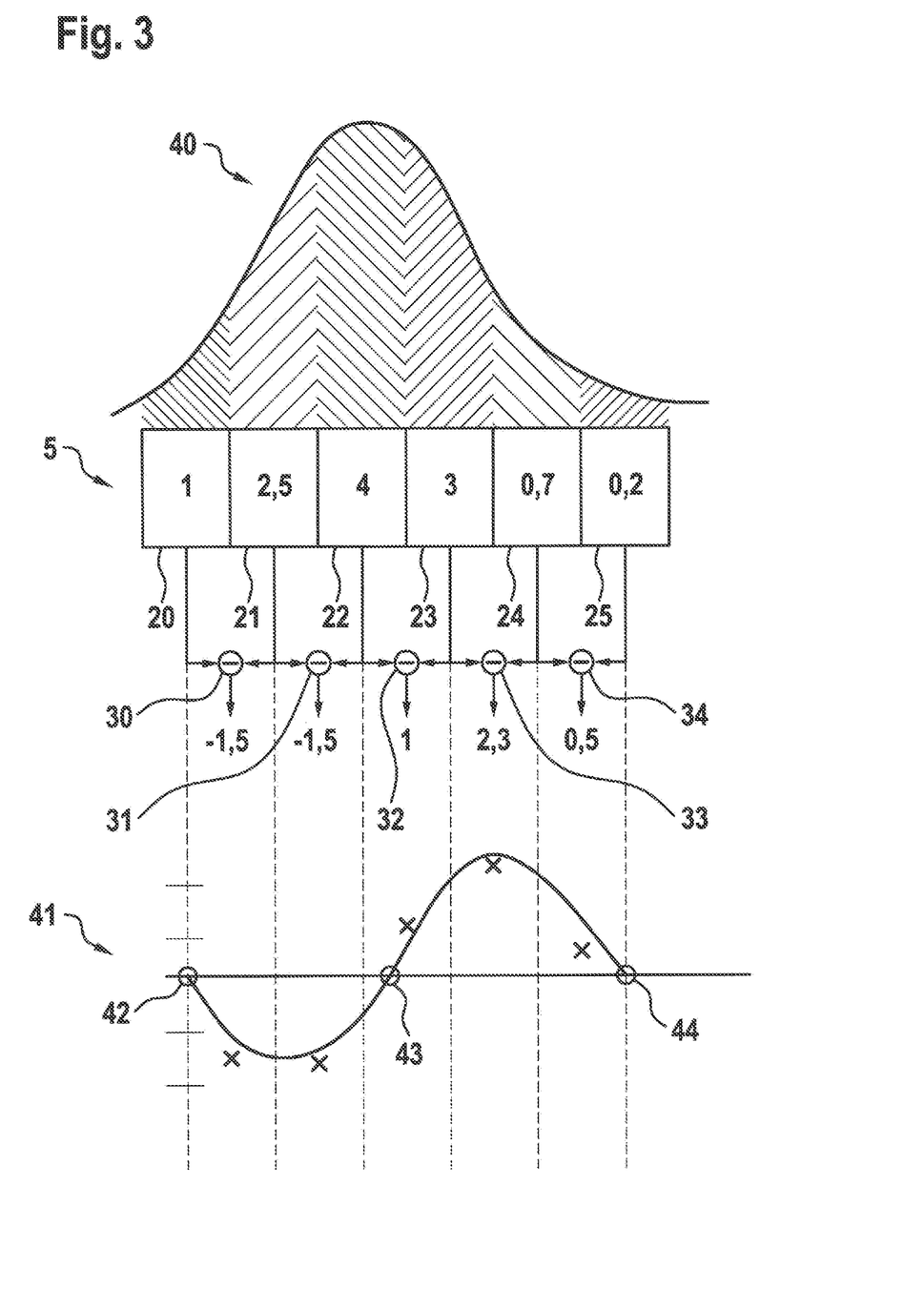
FIG. 3 shows a schematic representation of a detector array having a plurality of individual sensors.

In this first specific embodiment, the detector signal describes a position of second component 9 of light beam 7 projected onto detector array 5. The position is a point of maximum brightness of second component 9 of light beam 7 on detector array 5. FIG. 3 shows in a first curve 40 a characteristic of a brightness of second component 9 of light beam 7 on the surface of detector array 5. It may be seen that second component 9 of light beam 7 has a particularly high brightness at its center and that its intensity decreases toward its edge regions.

FIG. 3 furthermore shows detector array 5 with the plurality of individual sensors 21, 22, 23, 24, 25. Thus detector array 5 comprises at least a first sensor 20, a second sensor 21, a third sensor 22, a fourth sensor 23, a fifth sensor 24 and a sixth sensor 25. A number of sensors 20, 21, 22, 23, 24, 25 may vary, however. Each of the sensors 20, 21, 22, 23, 24, 25 is represented as a rectangle. A sensor value is entered in each rectangle, which is an output signal of the respective sensor that is a function of an illumination of the respective sensor 20, 21, 22, 23, 24, 25. The sensor values in this case are selected in exemplary fashion in the way in which they may occur when the detector array is illuminated in accordance with first curve 40. Thus it may be seen that third sensor 22 is illuminated in a particularly intense fashion since it is located at the center of second component 9 of light beam 7. Adjacent sensors of detector array 5 are coupled to one another via a subtracter circuit 30, 31, 32, 33, 34. Thus first sensor 20 and second sensor 21 are coupled via a first subtracter circuit 30. Second sensor 21 is coupled to third sensor 22 via a second subtracter circuit 31. Third sensor 22 is coupled to fourth sensor 23 via a third subtracter circuit 32. Fourth sensor 23 is coupled to fifth sensor 24 via a fourth subtracter circuit 33. Fifth sensor 24 is coupled to sixth sensor 25 via a fifth subtracter circuit 34.

The output values output by adjacent sensors are subtracted from one another by the coupling subtracter circuit. Thus the first sensor 20 outputs the sensor value "1" as output value and the second sensor 22 outputs the sensor value "2.5" as output value. Consequently, first subtracter circuit 30 outputs a value of "−1.5" on the output side. The values output on the output side by subtracter circuits 30, 31 are shown next to a second curve 41 in FIG. 3. The values output by subtracter circuits 30, 31 are marked as crosses. The output values of subtracter circuits 30, 31 are interpolation points for second curve 41. A zero crossing of second curve 42 is ascertained. The point of the zero crossing of this second curve 42 describes the position of the second component 9 of light beam 7 projected on detector array 5. The detector signal thus describes a location on detector array 5, which in turn describes the position of the second component 9 of light beam 7 projected on detector array 5. It should be noted that in this exemplary first specific embodiment the position of the second component of the light beam on detector array 5 is described merely in one dimension. This is illustrated in FIG. 3. It is possible, however, in a corresponding manner to determine the position in two dimensions. Accordingly, detector array 5 may either comprise a plurality of individual sensors 20, 21, 22, 23, 24, 25, which are arranged merely in a row, but it may also be a field of sensors 20, 21, 22, 23, 24, 25 that extends in two dimensions. Detector array 5 may thus also be a sensor field.

It is clear that in a corresponding manner it is also possible to ascertain a dimension and a shape of the second component 9 of light beam 7 projected on detector array 5 since a circumference of projected light beam 7 is likewise defined by roots of second curve 41. The roots are represented in second curve 41 as a first point 42, a second point 43 and a third point 44. The central root, that is, the second point 43, describes the position of the second component 9 of light beam 7 projected on detector array 5. The first point 42 and the third point 44 define an outer edge, that is, a circumference, and at the same time a dimension of the second component 9 of light beam 7 projected on detector array 5.

The detector signal is supplied to evaluation unit 6. Evaluation unit 6 is furthermore coupled to a position sensor 12, which detects a position of mirror 3. Using the detector signal, evaluation unit 6 ascertains an actual position of mirror 3. The calculation model of LiDAR system 1 is used for this purpose, in which a position of mirror 3 is assigned to each position of the second component 9 of light beam 7 projected on detector array 5. This assigned position of mirror 3 is regarded as the actual position of mirror 3. The actual position of mirror 3 is now compared to the position of mirror 3 detected by position sensor 12. If the two positions deviate from each other, then a deviation of position sensor 12 is determined and thus a system state is ascertained. In the following, a correction value is ascertained for position sensor 12, which is applied to the latter. The correction value is selected in such a way that a position of mirror 3 ascertained by position sensor 12 corresponds to the actual position of mirror 3.

It is clear that additionally or alternatively evaluation unit 6 is able to ascertain as a system state an orientation of optical components of the LiDAR system, a distortion of light beam 7 caused by the optical components of LiDAR system 1 and/or a direction of second portion 8 of light beam 7. Comparison values may be provided for this purpose, these comparison values describing in particular values of the detector signal when the optical components of LiDAR system 1 are oriented in optimized fashion, when there is no distortion of light beam 7 caused by the optical components of LiDAR system 1 and/or when the detector signal describes a correct direction of second portion 8 of light beam 7.

Figure 4:
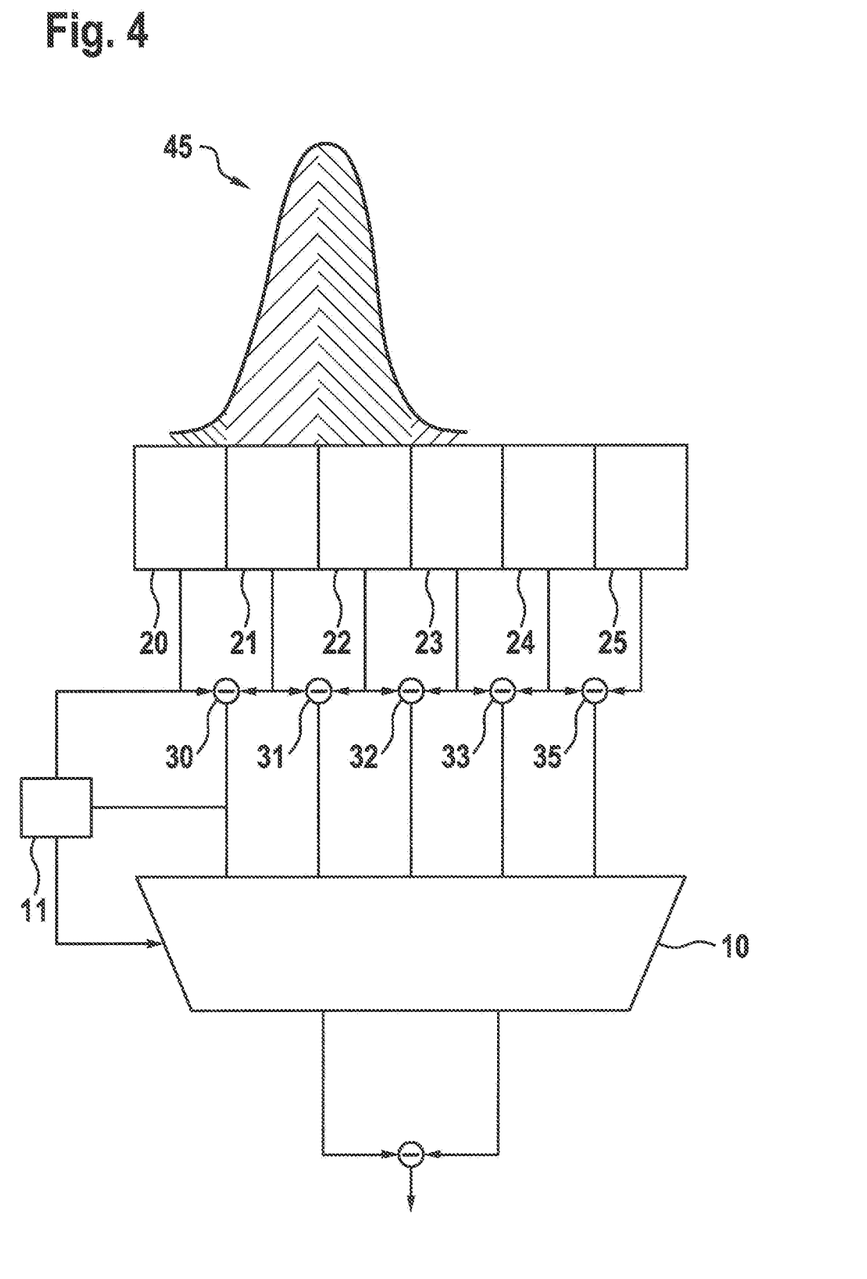
FIG. 4 shows a schematic representation of the detector array having a multiplexer situated on the detector array.

FIG. 4 shows detector array 5 having a multiplexer 10 situated on detector array 5. In this instance, detector array 5 is illuminated in accordance with a brightness characteristic represented in a third curve 45.

The construction shown in FIG. 4 allows for a particularly compact configuration of LiDAR system 1. The subtracter circuits 30, 31 are coupled on the output side to an input of multiplexer 10. Multiplexer 10 is able to select which of the signals provided by subtracter circuits 30, 31 enter into the detector signal.

In particular, only a selection of sensors 20, 21, 22, 23, 24, 25 is used to receive the second component 9 of light beam 7 reflected by transparent element 4 onto detector array 5. The remaining sensors are optionally deactivated. It is also possible merely to perform a selection of the sensors using multiplexer 10.

Thus, for example, the fifth sensor 24 and the sixth sensor 25 are deactivated if light beam 7 only excites the remaining sensors of detector array 5. Thus it is possible for example to deactivate some of sensors 20, 21, 22, 23, 24, 25 by a preselection since it is approximately known which of sensors 20, 21, 22, 23, 24, 25 are illuminated at a specific point in time.

Alternatively or additionally, the output signals of sensors 20, 21, 22, 23, 24, 25 are compared to a threshold value and only those output signals of sensors 20, 21, 22, 23, 24, 25 are used for generating the detector signal whose amplitude is greater than the threshold value. For this purpose it is possible either to compare the output signals of sensors 20, 21, 22, 23, 24, 25 to a first threshold value or to compare the output-side signals of subtracter circuits 30, 31, 32, 33, 34, 35 to a second threshold value. Such a comparison may be performed by a threshold value detector 11 for example, as is shown in exemplary fashion in FIG. 4. Via this threshold value detector 11, a selection is performed in multiplexer 10 as to which of the signals of subtracter circuits 30, 31 provided on the output side are transmitted to evaluation unit 6.

In summary, a construction of a transmission unit of LiDAR system 1 having an optical directional sensor system is shown in FIG. 2 as a block diagram. For each transmit pulse, the TOF system generates a trigger signal that is used both as a laser trigger with a corresponding time delay $\Delta T$ and as an activation signal for a front end between the detector array and the point of concentration calculation. A small portion of the emitted laser pulse is reflected on an optical element, for example a plano-concave lens, and illuminates detector array 5. Using various circuits, the transmit direction, the pulse power output, pulse length and start signal for the runtime measurement are now ascertained from the photostream of the different sensors of detector array 5.

A possible specific embodiment of a point of concentration calculation is shown in FIG. 3. For this purpose, the difference between the respectively adjacent sensors is ascertained. In a second step, the zero crossing of the differentiated signal is determined. In this case, a separate signal path is required for each sensor. In order to keep the number of signal paths low, alternatively a multiplexer 10 may be used, as shown in FIG. 4. Here it should be ensured that the spatial extension of the laser pulse on detector array 5 is not substantially greater than the area of the detector elements switched by multiplexer 10. If the pulse extends across two sensors 5 for example, then multiplexer 10 must also have two outputs. In this case, the illuminated detector elements are identified and switched via a threshold value detector 11. Subsequently, analogously to the circuit shown in FIG. 3, a point of concentration is calculated.

In addition to the above disclosure, explicit reference is made to the disclosure of FIGS. 1 through 4.

What is claimed is:

1. A LiDAR system, comprising:
an optical source to emit a light beam;
a mirror, which is disposed so that it reflects the light beam emitted by the optical source;
a partially transparent element, which is disposed with respect to the mirror so that the light beam strikes the partially transparent element after being reflected by the mirror, wherein a first component of the light beam passes through the partially transparent element and a second component of the light beam is reflected by the partially transparent element;
a detector array having a plurality of individual sensors, and which is disposed so that the second component of the light beam is reflected by the partially transparent element onto the detector array, wherein the individual sensors of the detector array are coupled to one another via subtracter circuits, the subtracter circuits performing a subtraction involving output values of adjacent sensors; and
an evaluation unit to receive a detector signal from the detector array, which describes a position of the second component of the light beam projected on the detector array, and to ascertain from the detector signal a system state of the LiDAR system, wherein the evaluation unit interpolates between values output by the subtracter circuits to determine a zero crossing of a curve represented by the values, the zero crossing of the curve describing the position of the second component of the light beam projected onto the detector array.

2. The LiDAR system of claim 1, wherein the mirror is disposed so as to be movable.

3. The LiDAR system of claim 1, wherein the detector signal describes the position of the second component of the light beam on the detector array that is projected on the detector array, wherein the position is a point of maximum brightness of the second component of the light beam on the detector array.

4. The LiDAR system of claim 1, wherein the subtracter circuits are coupled to a multiplexer on the output side.

5. The LiDAR system of claim 1, wherein only a selection of the sensors is active to receive the second component of the light beam reflected by the partially transparent element onto the detector array.

6. The LiDAR system of claim 1, wherein output signals of the sensors are compared to a threshold value and only those output signals are used for generating the detector signal whose amplitude is greater than the threshold value.

7. The LiDAR system of claim 1, wherein the system state of the LiDAR system describes an orientation of optical components of the LiDAR system, and wherein a distortion of the light beam is caused by the optical components of the LiDAR system and/or a direction of the second portion of the light beam.

8. The LiDAR system of claim 1, wherein the evaluation unit is coupled to a position sensor, which detects a position of the mirror, and wherein the evaluation unit is configured to ascertain an actual position of the mirror by the detector signal and comparing this actual position of the mirror with a position of the mirror detected by the position sensor to ascertain the system state.

9. The LiDAR system of claim 1, wherein the detector array is arranged so that the second component of the light beam strikes the detector array when the second component of the light beam is reflected in a surroundings of the LiDAR system.

10. The LiDAR system of claim 1, wherein the evaluation unit describes a size of the second component of the light beam projected on the detector array.

11. The LiDAR system of claim 1, wherein the evaluation unit describes a shape of the second component of the light beam projected on the detector array.

12. A method for ascertaining a system state of a LiDAR system, the method comprising:
- emitting a light beam using an optical source;
- reflecting the light beam emitted by the optical source using a mirror;
- dividing the reflected light beam by a partially transparent element into a first component and a second component of the light beam, the first component of the light beam passing through the partially transparent element and a second component of the light beam being reflected by the partially transparent element;
- receiving the second component of the light beam using a detector array having a plurality of individual sensors, wherein the individual sensors of the detector array are coupled to one another via subtracter circuits, the subtracter circuits performing a subtraction involving output values of adjacent sensors; and
- ascertaining a system state of the LiDAR system based on a position of the second component of the light beam projected onto the detector array, wherein an evaluation unit interpolates between values output by the subtracter circuits to determine a zero crossing of a curve represented by the values, the zero crossing of the curve describing the position of the second component of the light beam projected onto the detector array.

* * * * *